UNITED STATES PATENT OFFICE.

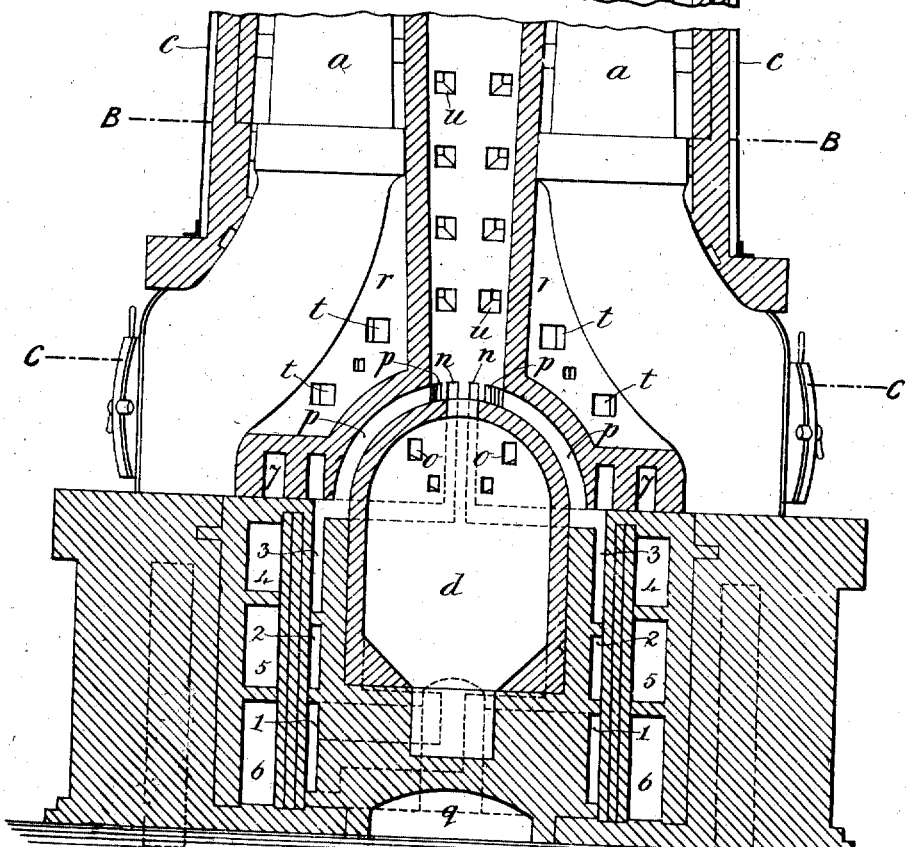

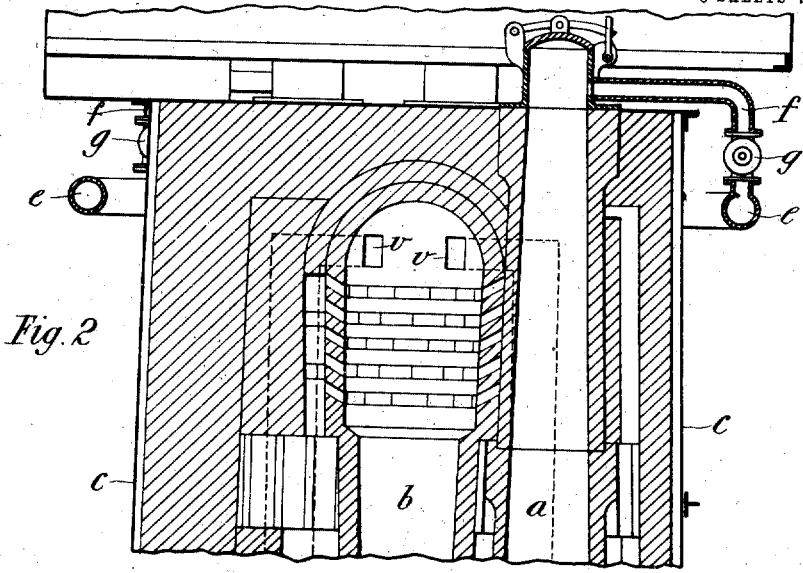
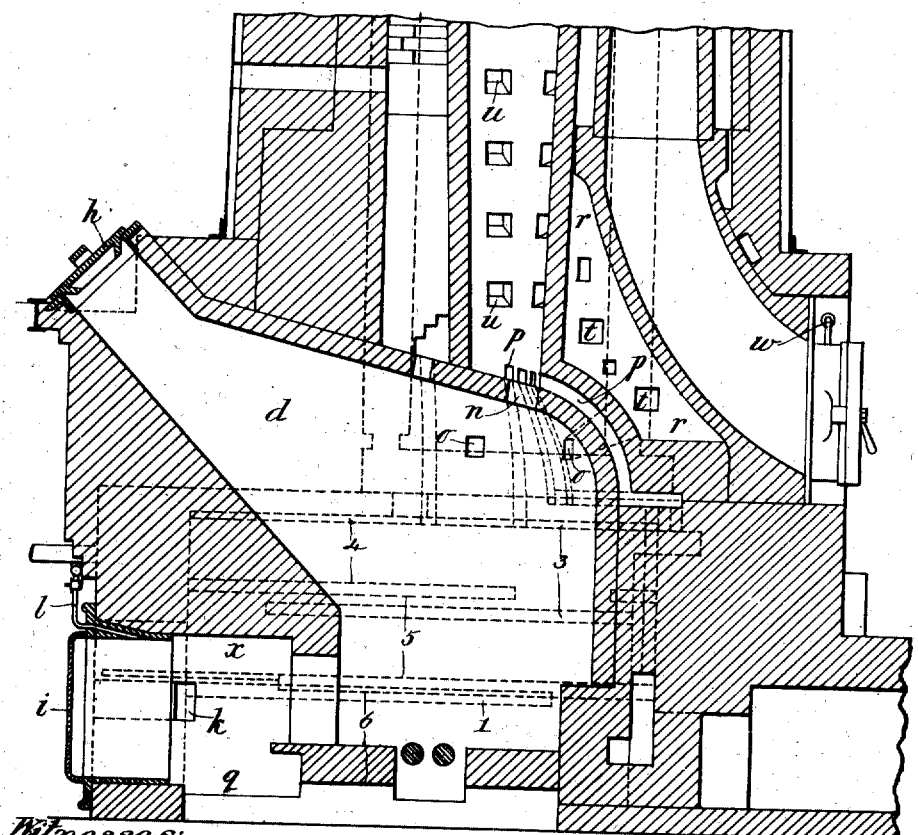

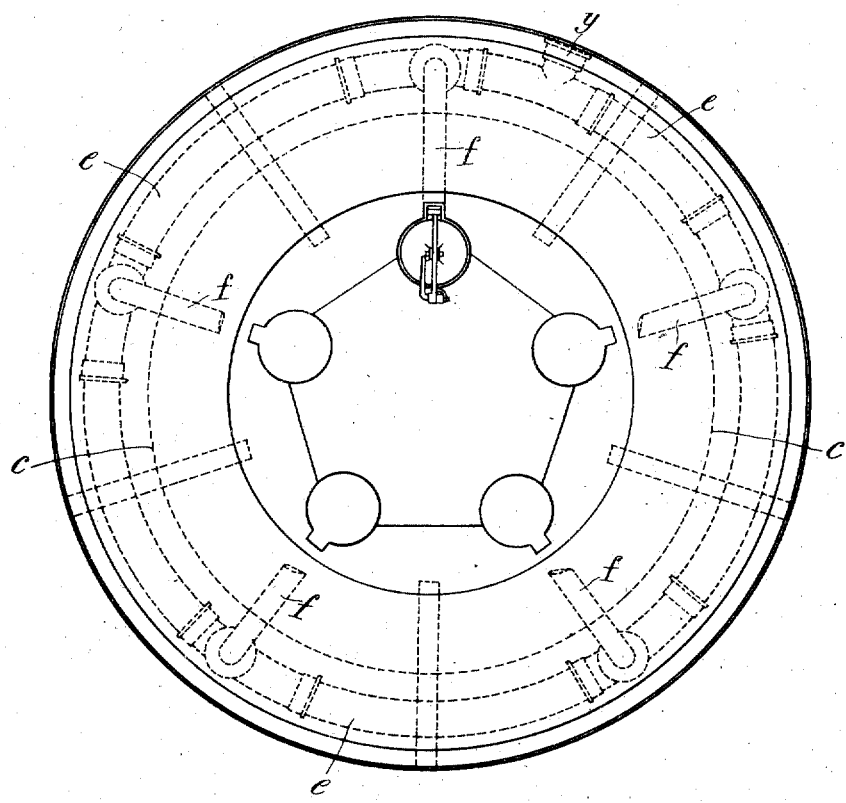

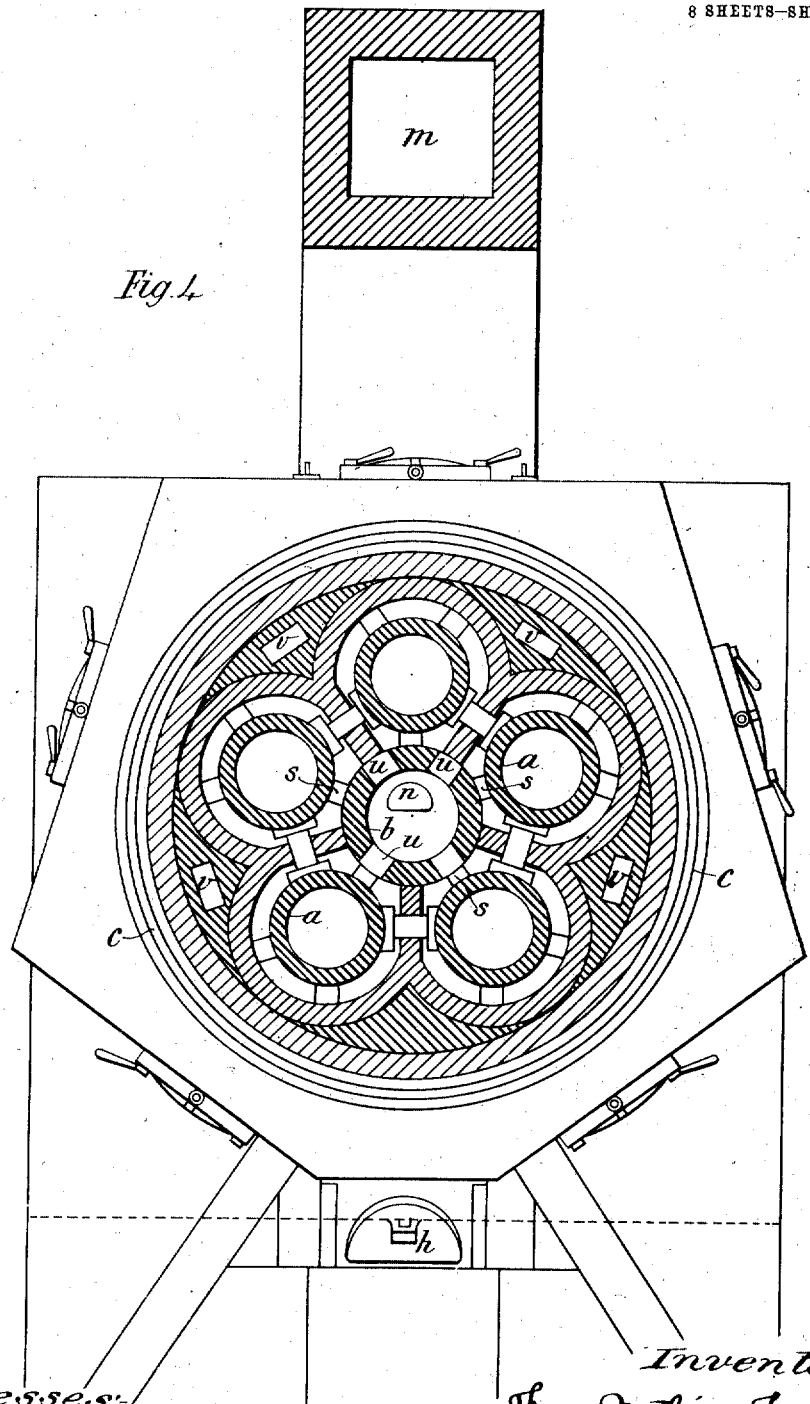

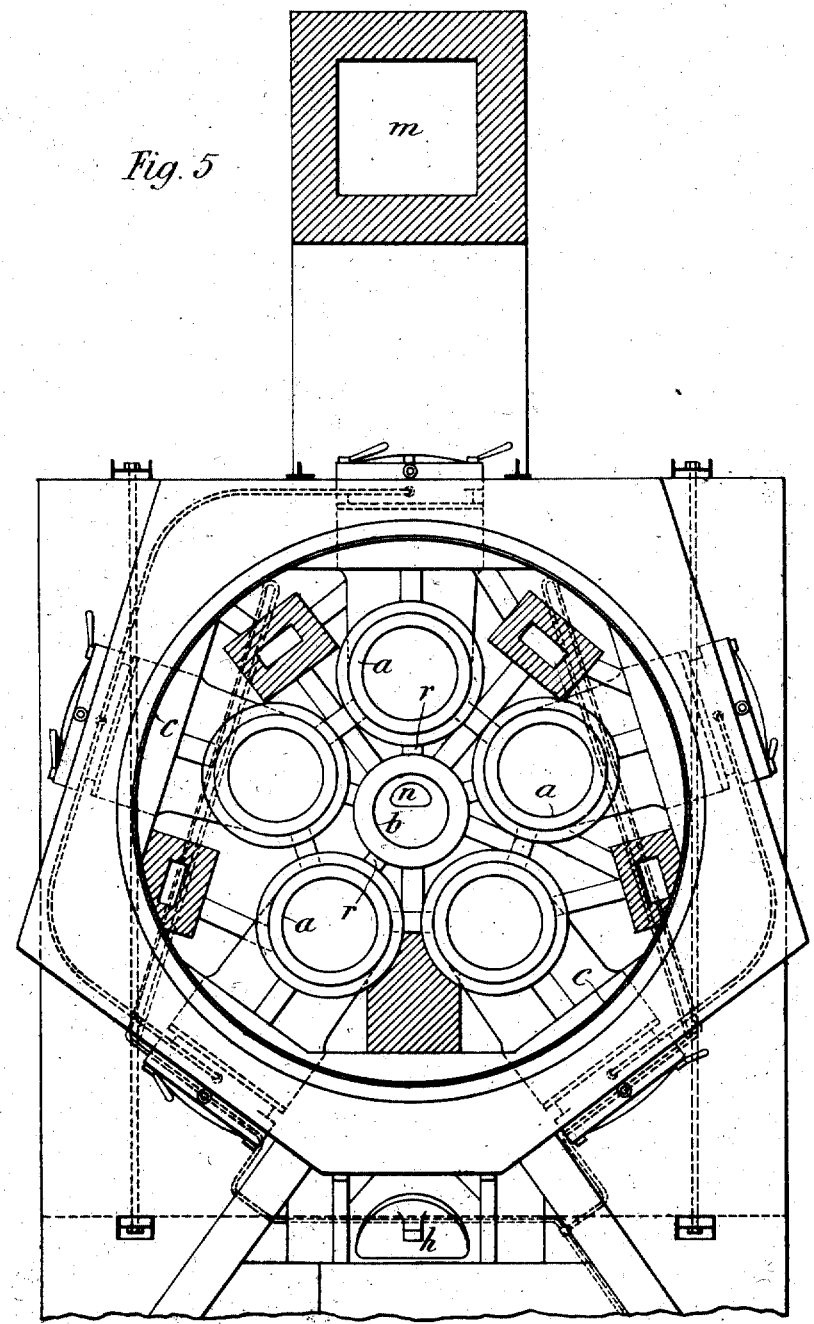

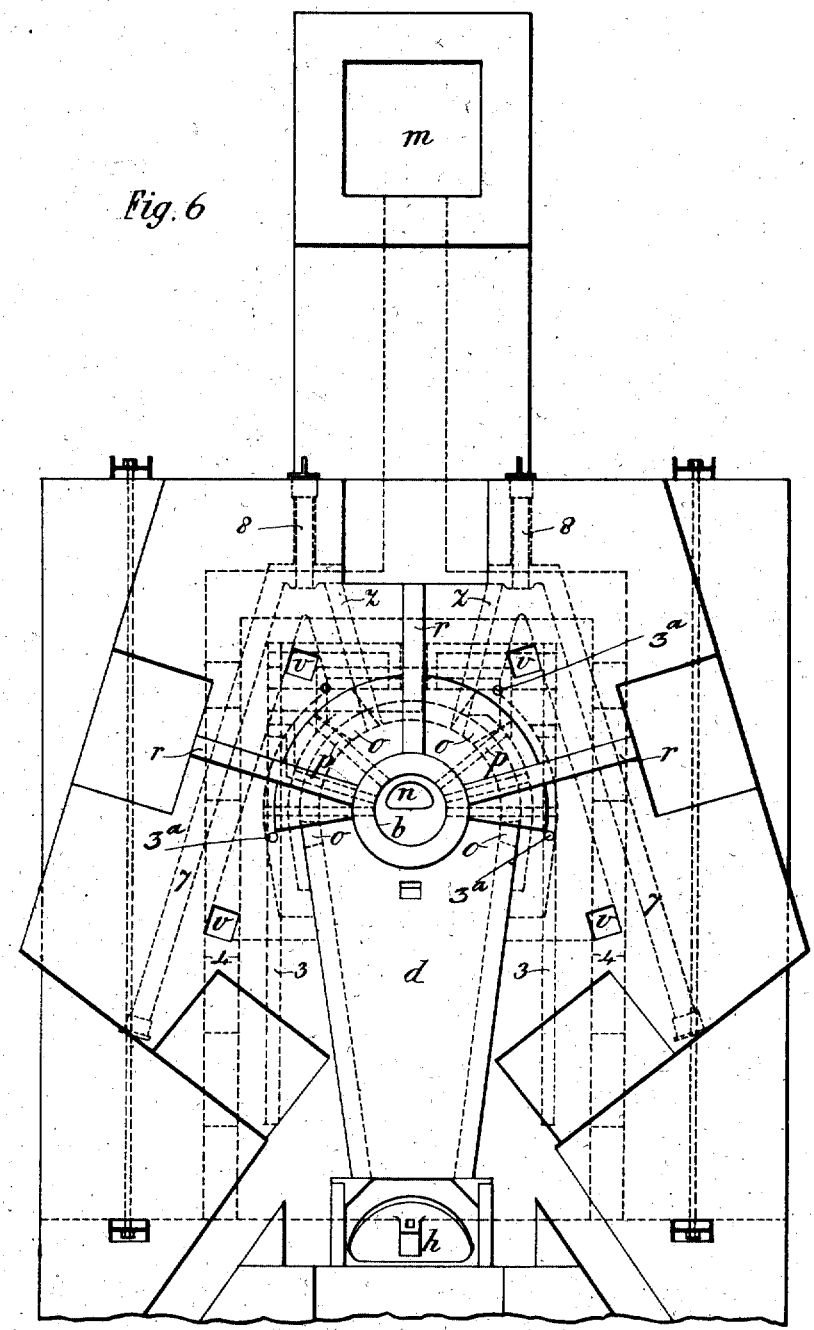

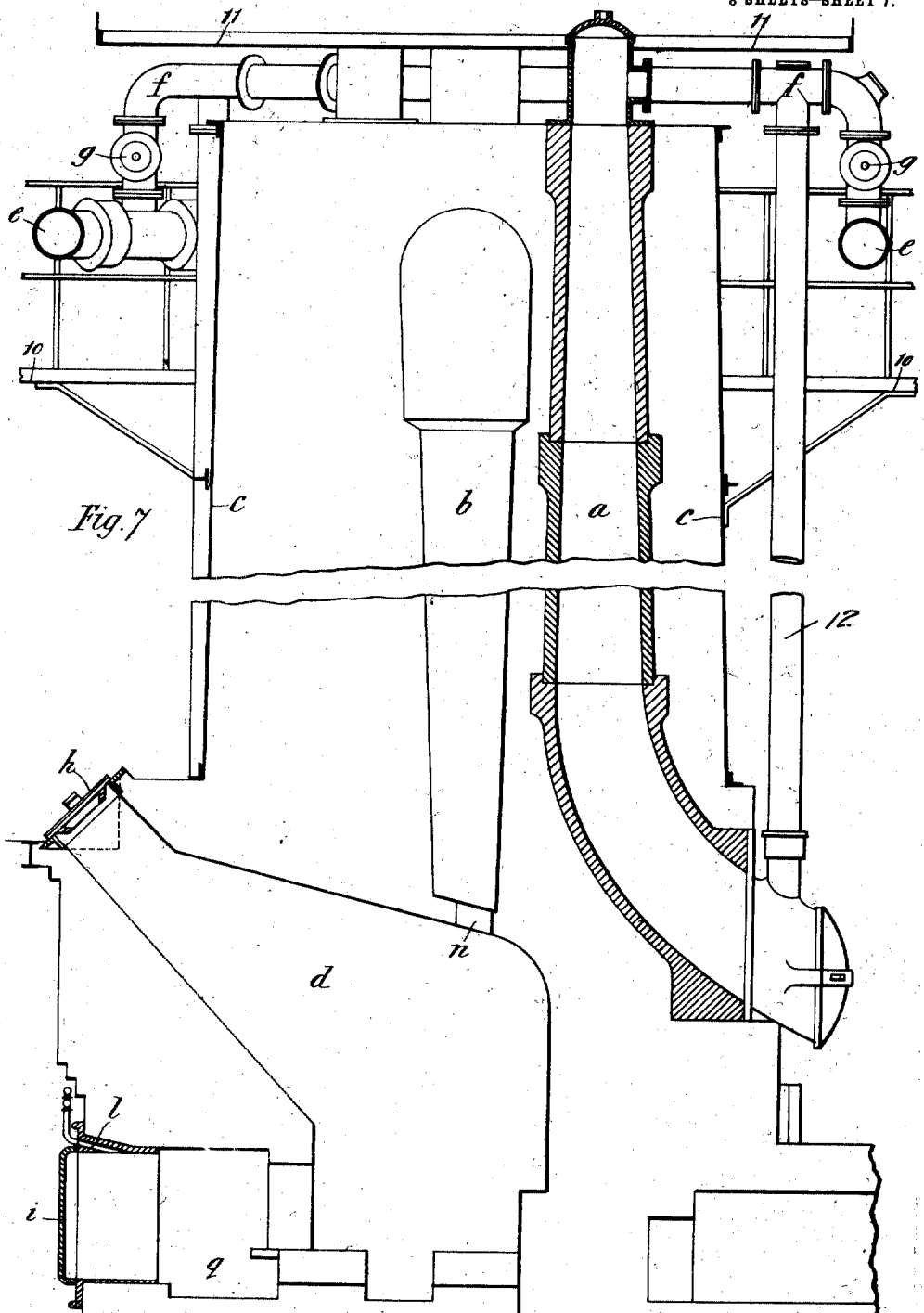

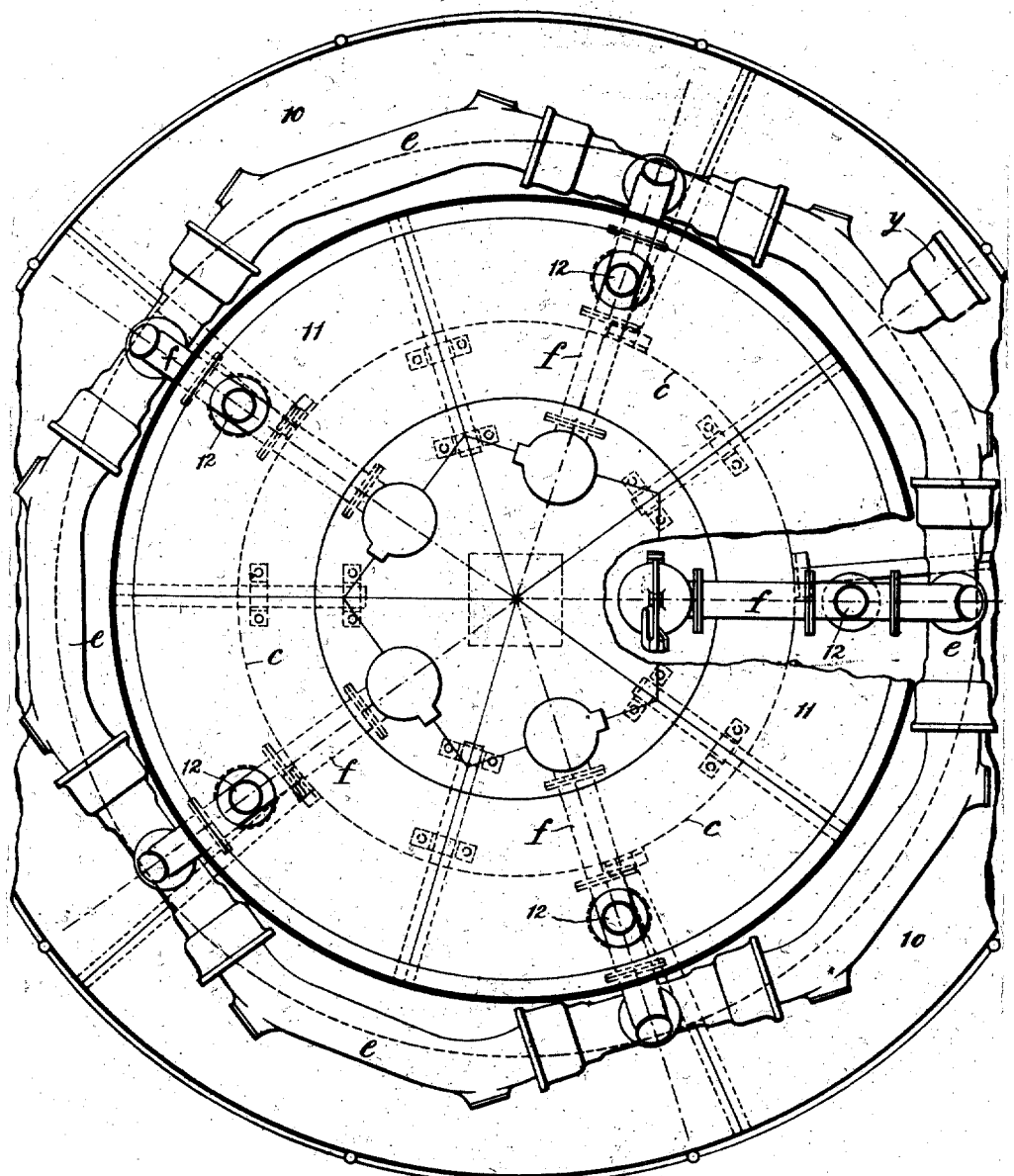

THOMAS MATHIESON THOM, OF CHESHUNT, AND HENRY PRYOR, OF HEMPSTEAD SAFFRON WALDEN, ENGLAND.

RETORT-FURNACE.

995,268.  Specification of Letters Patent.  Patented June 13, 1911.

Application filed September 20, 1909. Serial No. 518,697.

*To all whom it may concern:*

Be it known that we, THOMAS MATHIESON THOM and HENRY PRYOR, subjects of the King of Great Britain, and residents of Woodlands, Cheshunt, in the county of Hertford, England, and Hempstead Saffron Walden, in the county of Essex, England, respectively, have invented new and useful Improvements in and Relating to Retort-Furnaces for the Manufacture of Gas and other Purposes, of which the following is a specification.

The present invention has reference to apparatus for the manufacture of gas, for instance carbonic acid gas ($CO_2$) by decomposing limestone, or illuminating gas by the carbonization of coal, and for other purposes.

According to this invention the apparatus comprises closed retorts arranged vertically within an inclosed space around a combustion chamber provided with lateral openings leading to the space wherein the retorts are situated, and furnished with air supplies for supporting combustion in the manner hereinafter explained.

In the accompanying drawings we have shown apparatus embodying our present improvements.

Figure 1 is a vertical section of apparatus suitable for making $CO_2$ from limestone. Fig. 2 is a vertical section taken at right angles to Fig. 1. Fig. 3 is a top plan view. Fig. 4 is a cross section on the line A—A of Fig. 1. Fig. 5 is a cross section on line B—B of Fig. 1. Fig. 6 is a cross section on line C—C of Fig. 1. Fig. 7 is an elevation partly in section and partly in outline showing the modification of the apparatus necessary when making illuminating gas and Fig. 8 is a plan view of the same.

The apparatus comprises a number of closed retorts $a$ set in brickwork vertically, or approximately so, around a central combustion chamber $b$ and within an outer casing $c$ of steel or other suitable metal. In the drawings five retorts are shown, but there may be any other suitable number if desired. Beneath the combustion chamber $b$ is a producer $d$ and near the top of the apparatus is a ring main $e$ having branches $f$ communicating with all the retorts and being provided each with its own cut-off valve $g$. The limestone, coal or other gas yielding substance is fed into the retorts $a$ at the top and the lime or coke is discharged at the bottom. Both the bottom and top are provided with gas tight mouthpiece covers of any suitable construction. The producer $d$ is charged by the mouthpiece $h$.

$i$ is a clinkering door, $k$ are inlets arranged one on each side of the clinkering door to admit primary air which is raised to a high temperature in chamber $q$ before entering the producer proper.

$l$ is a steam inlet of the kind frequently employed in furnaces provided with a forced draft.

$m$ is the shaft or uptake for the waste gases from the furnace after their work is done.

At the top of the producer there is an aperture $n$ leading into the combustion chamber $b$ and there are also apertures $o$ leading out of the producer direct onto the lower ends of the retorts $a$ which ends are shown curved in the drawings. Secondary air is admitted by dampers arranged one on each side of the clinkering door and is led backward and forward and upward through flues 1, 2, 3 and issues into the combustion chamber $b$ via various radial flues $p$ these latter being tapped off flue 3. As shown in Fig. 6, there are also openings $3^a$ in the flue 3, from which likewise is drawn air for the apertures $o$. The combustion chamber $b$ has around it webs of brickwork $r$ which with the blockings $s$ support the retorts $a$. $t$ are holes in the webs $r$ to allow the gases from the furnace to circulate. Combustion and consequent sudden expansion due to the secondary air meeting the furnace gases occurs at the base of the combustion chamber and this expansion causes the gases generated to escape through louvered holes $u$ formed in the wall of the combustion chamber and circulating around the retorts through the blockings $s$ mentioned eventually reach the top of the combustion chamber which they again enter and from thence are conducted down the four waste gas flues $v$.

As shown in Fig. 6 two of the waste gas flues $v$ enter a common chamber on each side of the producer and from thence enter a series of chambers 4, 5 6 as shown in Fig. 1 in a similar manner but in opposite direction to the secondary air before mentioned. A damper $x$ regulates the passing of the waste gas from chamber 5 to chamber 6 from which last it escapes up the shaft.

Two outlets $z\ z$ see Fig. 6 admit producer gas into superheater chambers 7, 7 past dampers 8, 8. The chambers 7 contain U-shaped heaters as shown in Fig. 5 which are supplied with steam from the main feeding the forced draft. The superheated steam from the left hand heater Fig. 5 supplies steam to three retorts and the right hand heater to the remaining two. From the chambers 7 the producer gas may be brought to the bottom of the retort space where it will be consumed.

The steam jets enter at the lower mouthpieces of the retorts as shown at $w$ and are controlled by cocks. Superheated steam admitted to the retorts forces its way through the limestone, partially disintegrates it and effects the liberation of the $CO_2$ more quickly and at a lower temperature than by other known means. The steam continuing to rise carries with it the $CO_2$ and obviates the tendency of the latter which is a sluggish gas, to become reabsorbed after liberation from the limestone thereby forming sub-carbonate of lime. From the ring main $e$ the $CO_2$ passes by the outlet $y$ to a compressor, not shown, which draws off the gas and compresses it to the required pressure.

When illuminating gas is being made no steam is introduced into the retorts and consequently the apparatus is without the steam pipes (see Fig. 7) and the lower ends of the retorts are connected by pipes 12 to the branch pipes $f$.

The ring main $e$ for the illuminating gas plant is preferably formed as shown in the plan view Fig. 8. 10 and 11 are platforms near the top of the apparatus to give convenient access to the ring main and to the retort upper mouthpieces. From the ring main $e$, Fig. 8, the gas passes by the outlet $y$ to a gas holder through the usual cleaning apparatus. The cylindrical outer casing $c$ which is preferably lagged effectually prevents the admission of air to the retorts from the outside. The air admitted to the furnace and combustion chamber for the purposes of combustion is entirely consumed and therefore no air can find its way into the retorts through the interior of the apparatus.

Having now particularly described and ascertained the nature of our said invention, and in what manner the same is to be performed, we declare that what we claim is:—

1. In gas manufacturing apparatus, the combination of a producer, a central combustion chamber separate from and communicating with the producer, an inclosed retort space surrounding the combustion chamber, separate from and communicating with the producer, a set of approximately vertical retorts arranged within the retort space and means for supplying secondary air both to the combustion chamber and to the retort space exterior to the producer, substantially as described.

2. In gas manufacturing apparatus, the combination of a producer, a central combustion chamber separate from and communicating with the producer, an inclosed retort space surrounding the combustion chamber, separate from and communicating with the combustion chamber, a set of approximately vertical retorts arranged within the retort space and means for supplying secondary air to the combustion chamber exterior to the producer, substantially as described.

In testimony whereof we have signed our names to this specification in the presence of two subscribing witnesses.

THOMAS MATHIESON THOM.
HENRY PRYOR.

Witnesses:
 ALFRED S. BISHOP,
 FREDK. L. RAND.